United States Patent [19]
Barker

[11] 3,733,478
[45] May 15, 1973

[54] TRANSPORTABLE CONTAINER FOR ELECTRIC CORDS AND CONNECTORS

[76] Inventor: James D. Barker, R. D. No. 1, Kittaning, Pa. 16201

[22] Filed: June 14, 1971

[21] Appl. No.: 152,567

[52] U.S. Cl..................240/2 R, 240/8.18, 240/52.3
[51] Int. Cl...............................................F21v 15/22
[58] Field of Search......................240/8.18, 2 R, 11, 240/11.2 R, 38, 52.3, 81 P, DIG. 2; 191/12.2 R, 12.4

[56] References Cited

UNITED STATES PATENTS

| 3,294,968 | 12/1966 | Cloyd | 240/8.18 X |
| 1,643,656 | 9/1927 | Haselton | 240/DIG. 2 |
| 2,803,742 | 8/1957 | Bellamy | 240/11.2 R X |
| 780,322 | 1/1905 | Callender | 240/DIG. 2 |
| 1,281,162 | 10/1918 | Holloway | 240/8.18 |
| 2,654,828 | 10/1953 | Vandenberg | 240/8.18 |
| 648,673 | 5/1900 | Schlesinger | 240/8.18 X |
| 2,802,932 | 8/1957 | Lambert | 240/8.18 X |

Primary Examiner—Joseph F. Peters, Jr.
Attorney—John A. Young

[57] ABSTRACT

A portable power box has a handle and internal oppositely wound reels, with extension cords one on each of a respective reel, the box also includes an outlet receptacle. The two reels are electrically connected by means of a plurality of sets of copper points and the reels are proportioned to accommodate the desired size and length of electrical cord. The portable box includes a trouble light on one cord and a plug on the other cord and means are provided on the handle to receive and clamp the respective cords at the desired pulled out lengths.

The power box may also include an attachment clip whereby it can be easily mounted as a whole for convenient carrying.

5 Claims, 9 Drawing Figures

INVENTOR
JAMES D. BARKER
BY John A. Young
ATTORNEY

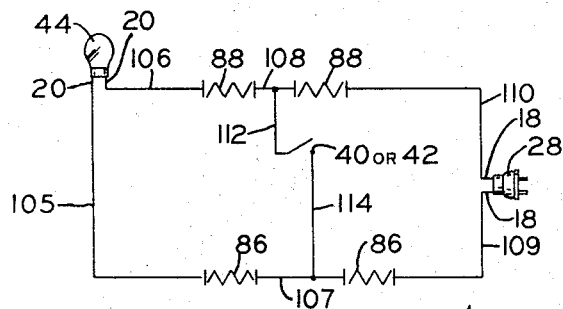
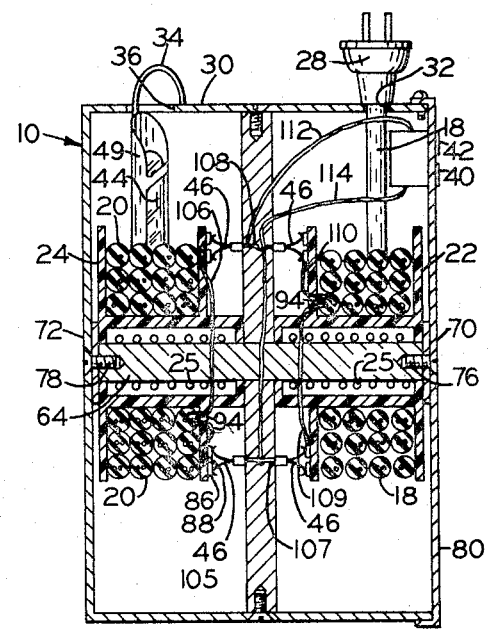
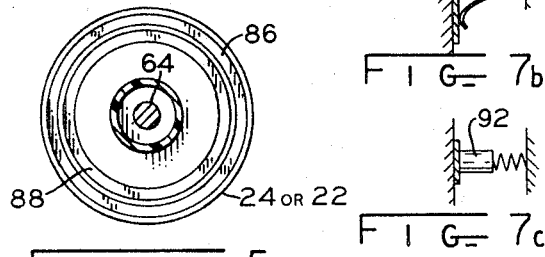
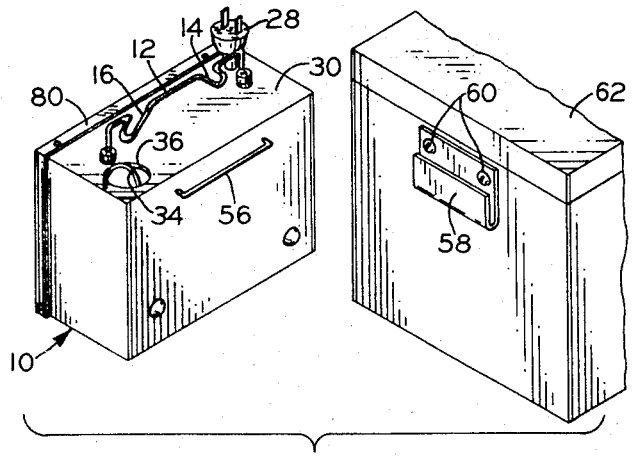
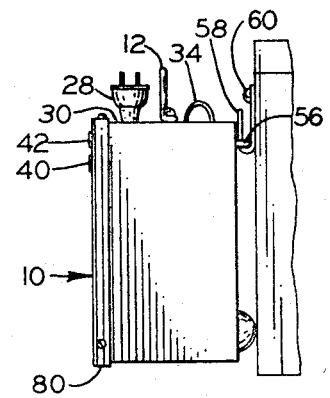
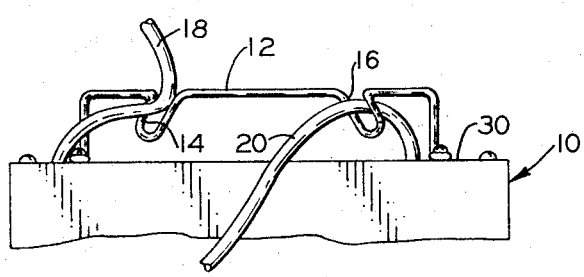

TRANSPORTABLE CONTAINER FOR ELECTRIC CORDS AND CONNECTORS

BACKGROUND OF THE INVENTION

In many applications, it is necessary to have a portable power box which is readily transportable and which can be connected to a source of power and itself become a power outlet box. There is a substantial need for an electrically reliable power box with internal sets of extensible cords so that power tools and other electrically operated devices can be operated at given desired locations. The gist of the requirement is that the power box should be easily carried from one point to the next and then dispense the extensible cords at preferred lengths from a given location. A portable power box of the type described is useful at construction sites, coal mines and various other locations where need for electrical outletting varies considerably from place to place; and because of the variation, it requires that an available electrical outlet be variously placed for illumination, power tool operation and the like.

OBJECTS OF THE INVENTION

It is the principal object of the present invention to provide a transportable power box having electric cords which are mounted on spring operated wind up reels and are extensible to whatever length is required, and are then locked in extended positions.

Another object of the present invention is to provide a transportable power box with two spring resistant reels, each having an electric cord providing a variable length which can be pulled off the reel and then locked in place to provide electric power to the box, such box including electric outlets for electrically powered tools, illumination and the like.

A further object of the present invention is to provide a pair of oppositely winding reels interconnected by sets of copper points for electrical contact, from which a plurality of power operated tools or other electrically operated devices can be used.

A still further object of the present invention is to provide a transportable power box having a handle which includes clamping means whereby a cord dispensed from a spring operated reel can extend to variable lengths, said cords being then clamped at the preferred length on the handle and the box then utilized.

A still further object of the present invention is to provide a new and improved power box having electric cards mounted on oppositely turnable supply reels, said reels being electrically interconnected by copper points for electrical contact, the reels being of such size as required to accommodate the required size and length of electrical conductor.

A still further object of the present invention is that at the end of each cord is an electrical device such as a socket, trouble light or the like, such device then coming into engagement with the box in the vicinity of an opening through which the cord is drawn so that the retracted position of the cord is defined by the contact of said device with the box.

Other objects and features of the present invention will become apparent from a consideration of the following description.

DRAWINGS

In the drawings, FIG. 1 is an isometric view of a power box with the two cords partially extended from the supply reels and having respectively at the end thereof a plug and trouble light;

FIG. 2 is an isometric view showing the two cords fully retracted;

FIG. 3 illustrates how the cords are clamped at preferred extended positions by fitting into slots on the transporting handle;

FIG. 4 illustrates the reel and sets of copper points forming electrical contacts between the respective reels;

FIG. 5 is a section view taken on line 5—5 of FIG. 4;

FIG. 6 illustrates how the power box can be fitted onto another structure such as a tool box for transportation with the tool box; and FIGS. 7A, 7B, 7C are detailed views of the electric circuit.

DETAILED DESCRIPTION OF THE INVENTION

Figure 1:
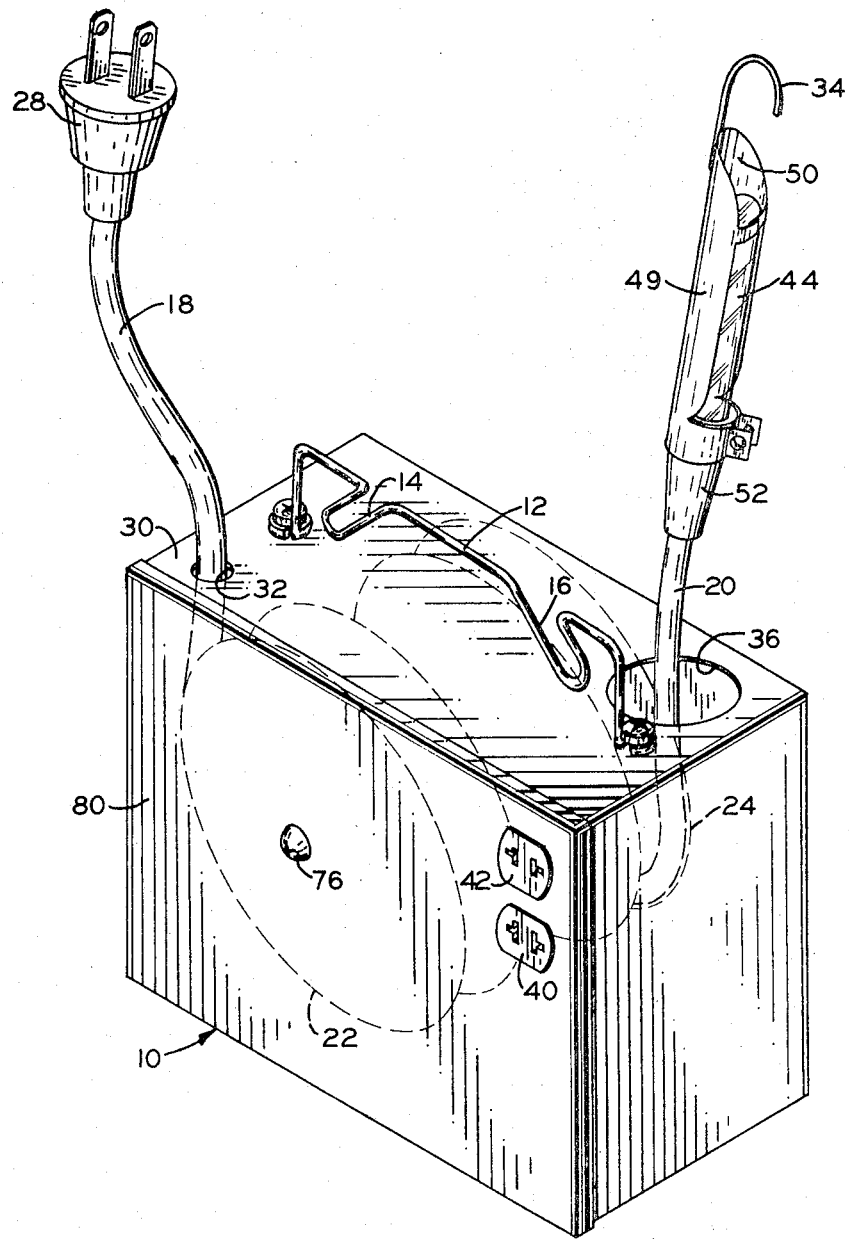

Referring now to the drawings, a power box designated generally by reference numeral 10 has a handle 12 which includes two notches 14, 16, which receive therein one or the other of two electric cords 18, 20 as indicated in FIG. 3.

Each of the cords 18, 20 is wound on a respective spring loaded reel or drum 22, 24, the purpose of the spring loading is to maintain the respective cords in a normally wound or retracted position. Once the cord is pulled off the reel to the desired length, it will retain its pulled-out length if a section of the cords is passed into notch 14 or 16. The springs 25 associated with the reels cause the two cords 18,20, to rotate in counterclockwise directions, maintaining the cords in a normally fully retracted position wherein plug 28 at the end of cord 18 is held against surface 30 of the box surrounding opening 32 through which the cord is drawn from the reel 22. The cord 20 is retracted onto reel 24 to an extent that the hook 34 is held against surface 30 of the box adjacent the opening 36. While transportating the box 10 the electric cords are normally fully retracted.

The box has two electrical outlets 40, 42 so that when the box receives electrical energy from a source derived through plug 28, other electrically powered means can be energized by plugging into outlets 40, 42 or both and the light 44 and outlets 40, 42 are energized.

The plug 28 and trouble light 44 at the end of cord 20 are electrically connected by a series of contacts 46, or 48 on the respective reels, there being four sets of such contacts to insure electrical contact between the reels at all times. The electric plug 28 once it is connected with an electrical energy source, is sufficient to energize the outlets 40, 42 as well as light 44. Light 44 is protected by a shield 49 which has a reflective surface 50 to concentrate the beams and a cone 52 of hard rubber or plastic material insures guiding through opening 36 without damage to the bulb or shield 49 until hook 34 can engage the side 30 of the box as indicated in FIG. 2. The portable box has a clip 56 which can fit into a U-shaped mounting bracket 58 held by screws 60 to a tool box 62. The portable power box is thus easily and conveniently carried either by the handle 12 or by the clip 56 whichever is preferred.

The two supply reels 22 and 24 are counterrotatable on a common journal or shaft 64, the ends of the shaft being journaled at ends 66 on sides 70, 72 of the portable box. The ends of the shaft 64 are held against lateral movement by fasteners 76, 78.

The box has a removable lid 80 which is secured by metal screws or the like and are removable in order to provide access to the interior of the box for servicing thereof.

Referring to FIGS. 4, 7A, 7B and 7C, cords 18, 20 are normally rotated by springs 25 to full retraction, on the reels 22, 24. The two reels are electrically connected by means of outer slip rings 86 and inner slip springs 88 on the reels. The slip rings are electrically connected by means of bifurcated electrical contacts 90 and/or spring loaded brushes 92. The end of electric cord 18 has a lead 94 connected to inner and outer slip rings 86, 88. Spring contacts 46 and conductors 107, 108 connect the inner and outer slip rings of the reel 22 to the inner and outer slip rings of reel 24 which in turn are connected to the lead 94 of cord 20 on reel 24 leading to the lamp or trouble light 44. Electrical conductor 112 is connected to slip ring 88 of reel 24 and conductor 108, to slip ring 88 of reel 22 through conductor 110 to cord 18; conductor 114 is connected to conductor 107, slip ring 86 of reel 22, conductor 109 to cord 18. As indicated in FIGS. 4 and 7A the electrical outlets 40, 42 are connected in parallel with the light 44 so either is separately activated. The electrical circuit to the light 44 consists of cord 18, conductor 109, slip ring 86 of reel 22, contact 46, conductor 107, slip ring 86 of the other reel 24, conductor 105 electric cord 20, trouble light 44, cord 20, conductor 106, slip ring 88 of reel 24, conductor 108, contact 46, slip ring 88 of reel 22, conductor 110 to cord 18, plug 28.

The electrical connection between the reels is by means of either a spring contact 90 or spring loaded brushes 92 which permit the reels to be counterrotated relatively to each other without disturbing the electrical connection between the two reels.

Because electrical outlets 40, 42, can be energized by a parallel circuit independently of the trouble light 44, the box has considerable selectivity and adaptability.

Although the present invention has been illustrated and described in connection with a few selected example embodiments, it will be understood that these are illustrative of the invention and are by no means restrictive thereof. It is reasonably to be expected that those skilled in the art can make numerous revisions and adaptations of the invention to suit individual design requirements, and it is intended that such revisions and adaptations will be included within the scope of the following claims as equivalents of the invention.

What is claimed is:

1. A transportable box having two independently mounted and relatively movable spring-loaded reels, each separately movable from the other, a first cord received on one of said reels and having an electric plug at the end thereof, a second cord received on the other of said reels and having a bulb thereon, a handle for carrying said box and including at least one slot for gripping and retaining one or the other of said cords and holding the extended cord at a given position, and electrical outlet means for electrically connecting said transportable box to a given output which is energized from said electric plug; and means for mounting and transporting said box.

2. The portable power box in accordance with claim 1, including a plurality of movable sets of electrical contacts on the respective reels for electrically connecting the wound cords on said reels and unaffected by the extent of unwinding movements of said cords.

3. The portable light and power box in accordance with claim 1, wherein said outlet means is comprised of two electrical sockets for providing power take-off from said portable box at a distance from the primary source provided by said electric cords.

4. The portable power box in accordance with claim 1 wherein said cords are each oppositely wound under spring force upon a respective reel.

5. The portable box in accordance with claim 1 wherein said reels are mounted on a common axis of rotation and are counterrotated against a resilient resistance which will effect winding force upon the respective cords, an aperture in said box for the respective cords through which the cords are drawn, and means forming a stop on said box for defining the maximum retracted position of a respective cord.

* * * * *